Jan. 17, 1956 — A. B. NORRIS — 2,730,834
ANIMAL TRAP
Filed July 10, 1953 — 2 Sheets-Sheet 1

Archie B. Norris
INVENTOR.

Jan. 17, 1956
A. B. NORRIS
2,730,834
ANIMAL TRAP
Filed July 10, 1953
2 Sheets-Sheet 2
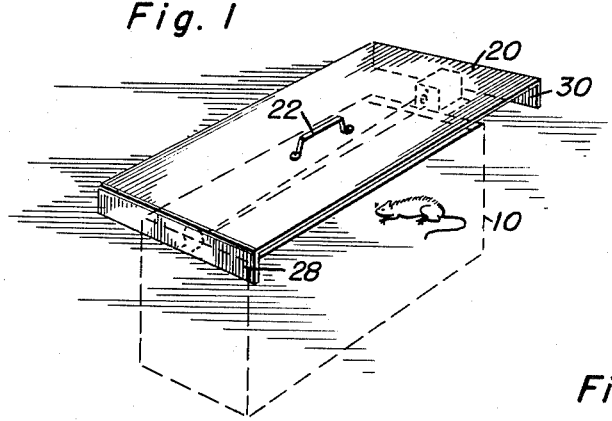
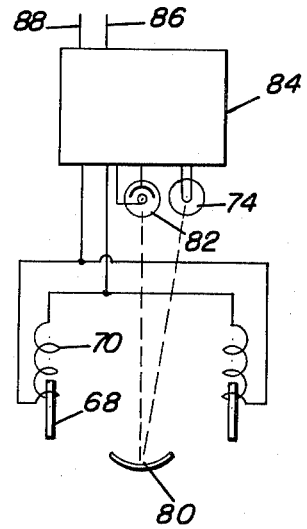
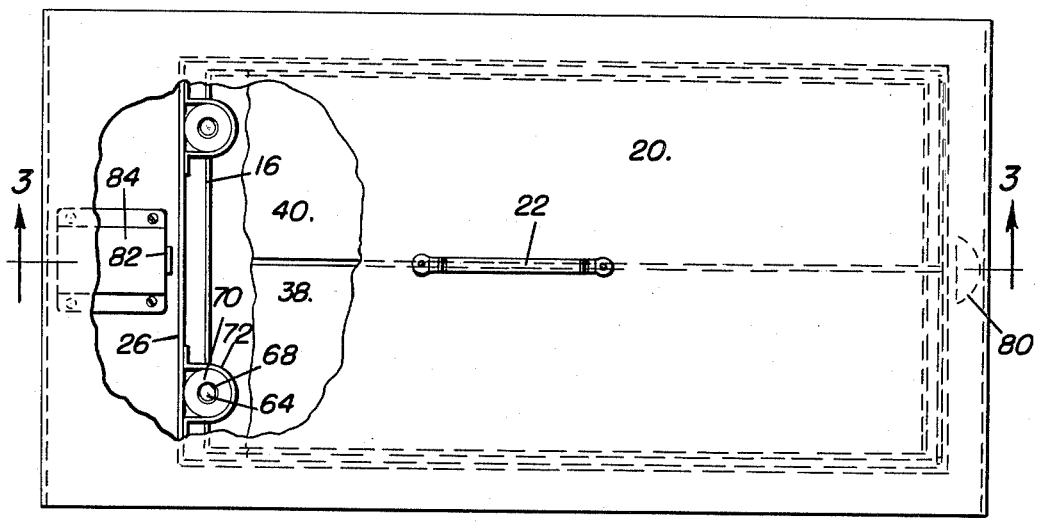
Archie B. Norris
INVENTOR.

United States Patent Office 2,730,834
Patented Jan. 17, 1956

2,730,834

ANIMAL TRAP

Archie B. Norris, Cary, N. C.

Application July 10, 1953, Serial No. 367,303

2 Claims. (Cl. 43—69)

This invention relates to an animal trap and particularly to an electrically operated trap for catching rodents such as rats and the like.

In the struggle against rodent infestation, it has been long customary to provide traps of various kinds to catch or kill the rodents. Most of these traps have been of a variety either attracting the rodent by means of a bait which is attached to a suitable trigger or by means of trigger devices which are contacted by the rodents to cause operation of the trap. It frequently happens that the rodents will successfully pass over or around the trap without disturbing the trigger or even may steal the bait from the trap without triggering the device.

The present device provides an electrically operated trap having light means responsive to the presence of a rodent for tripping a trap door so that the rodent may be precipitated into a cage or into a vat of water which may be desired.

The trap according to the invention is constructed as a container having an open top with a trap unit mounted thereon with the trap unit provided with a covered passageway which is inviting to rodents and which will protect the trap from accidental intrusion from the upper surface and having a light beam projector projecting a light beam across the passage and a reflector reflecting the light beam back to another light-responsive cell for controlling the operation of a trap door which forms the bottom of the passage.

It is accordingly an object of the invention to provide an improved animal trap.

It is a further object of the invention to provide an improved electrically operated animal trap.

It is a further object of the invention to provide an animal trap having a covering to prevent accidental intrusion therein.

It is a further object of the invention to provide an improved electrically operating device for tripping a trap-door of a trap.

Other objects and many of the attendant advantages of the present invention will be apparent from the following detailed description taken in conjunction with the accompanying drawing, in which:

Figure 1 is a perspective view of the animal trap according to the invention with parts in phantom;

Figure 2 is a top plan view of the trap with parts broken away;

Figure 5 is a circuit diagram of the electrical operating system of the trap.

In the exemplary embodiment according to the invention, the trap comprises a container member 10 adapted to be mounted in an opening 12 in a floor 14 or other surface over which the rodents are accustomed to move. A tank 16 may contain water or other fluid for subduing by drowning a rodent which is immersed therein and preferably, if water is utilized, a suitable detergent will be placed in the water so that the rodents falling thereinto will rapidly wet and drown to prevent their continued suffering.

Figure 3:
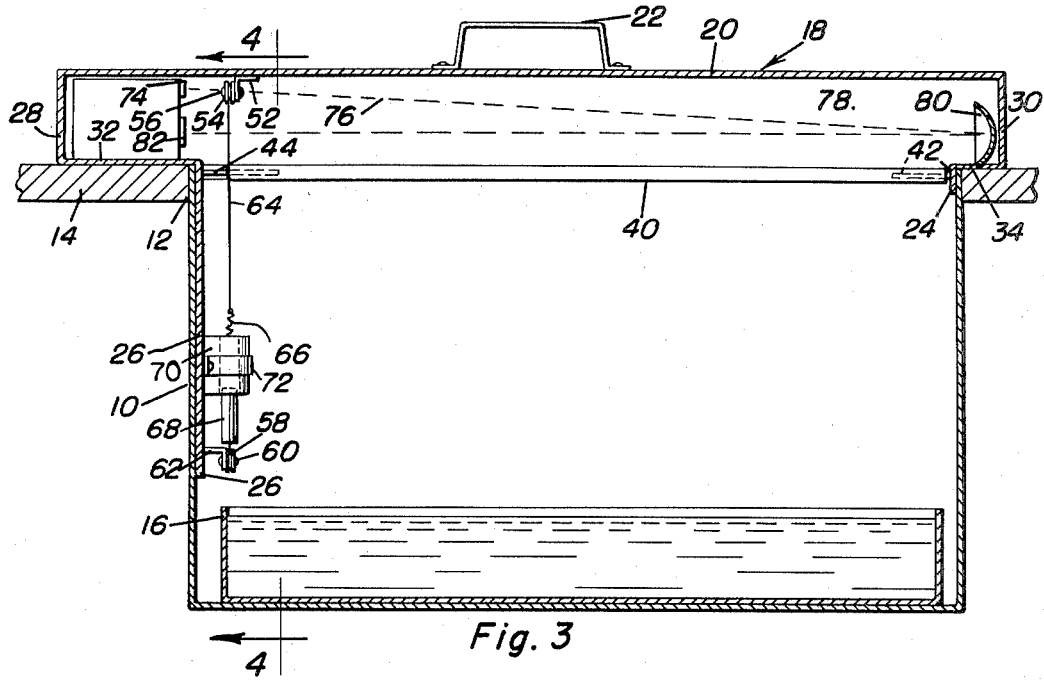
Figure 3 is a partial sectional elevation of the trap taken substantially on the plane indicated by the line 3—3 of Figure 2 with the handle and control device not in section.
Figure 4:
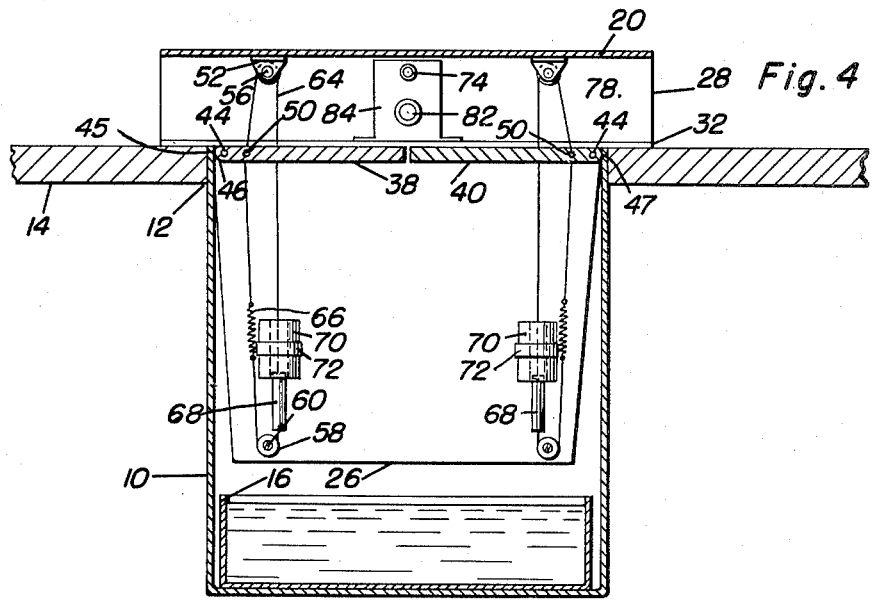
Figure 4 is a transverse section of the trap taken substantially on the plane indicated by the line 4—4 of Figure 3 and showing the trap control arrangement.

A trap unit indicated generally at 18 comprises a cover portion 20 on which is mounted a handle 22 for operating the cover unit or removing it from the body portion 10 as may be desired. The trap unit is provided with downwardly directed flanges 24 and 26 which are adapted to extend into the container 10 and locate the trap unit with respect thereto. The cover portion 20 includes downwardly directed end portions 28 and 30 which respectively define offset spaces with inturned flange members 32 and 34 which are parallel to the cover portion 20, the inturned flange members 32 and 34 being respectively connected to the previously mentioned, downwardly directed flanges 26 and 24, respectively. The lateral sides of the unit are left open to provide a passageway or runway therethrough, and the bottom of the passageway is constituted by means of trap-doors 38 and 40 which are hingedly connected between the flanges 24 and 26 by means of pivot pins 42 and 44, the pins 42 and 44 extending into the opposite ends of the trap-doors adjacent the outer longitudinal edges 45 and 47, respectively of the doors 38 and 40 so that the trap-doors have a tendency to pivot downwardly into the container 10. The edges of the doors 38 and 40 adjacent to the edge of the container may have a rounded edge surface 46, as seen in Figure 4, so that the doors 38 and 40 will freely rotate about the pins 42 and 44 into a depending position. In order to maintain the doors 38 and 40 in a proper closed position to provide the floor of the passage, an actuating pin 50 is placed in the ends of the doors 38 and 40, respectively, with the pins 50 being spaced inwardly from the pivot pins 44. A bracket 52 is mounted on the underside of the top portion 20 of the trap unit. A sheave 54 is journaled on a pivot pin 56 fixed in the bracket 52. A similar sheave 58 is journaled on a pin 60 mounted on a bracket 62 suitably secured on the lower or adjacent to the lower edge of the flange 26. A flexible tensioning member 64 has both ends thereof fixedly secured in any suitable manner to the pin 50 with the central portion being entrained over the sheaves 54 and 58 so as to form a substantially continuous extension element. Preferably a resilient element such as a spring 66 is placed intermediate the ends of the tension member 64 so as to maintain the flexible element 64 under tension. A weight or solenoid rod 68 is connected to the flexible member 64 somewhere adjacent the portion between the sheaves 54 and 58. An electromagnetic motor herein illustrated as a hollow solenoid coil 70 is mounted to the flange 26 by means of a bracket 72.

The coil 70 is energized by means of a suitable control system herein shown as comprising a light beam source 74 for directing a light beam 76 across the passage or runway 78 of the trap unit against a reflector element 80 placed in the offset portion provided by the inturned portion 34 adjacent to the end 30. The reflector 80 returns the light beam to a photo-sensitive source 82 which actuates a suitable well-known control circuit enclosed in the casing 84.

In the operation of the device, if it is intended to drown the rodents, the container 16 will be filled with a suitable liquid or if it is desired to retain the rodents in a live condition the container 16 will be replaced by a suitable cage, not shown. To place the trap in operation, it is positioned in a suitable position to entice the rodents to pass through the covered passage or runway 78 and the light beam projector 74 will be energized to maintain the light beam across the passage 78 by reflection from the element 80 to impinge on the light-receiving means 82 to energize the same which will energize the control device 84 to maintain the coils 70 in de-energized condition so that the weight or solenoid rod 68 will maintain the trap-doors in substantially parallel relation forming an enticing floor for the passage. As soon as any object interrupts the light beam 76, the light-sensitive device 82 will be deenergized, causing operation of the control device 84 to connect the source of electrical energy herein indicated as the conductors 86 and 88 to the solenoid coil 70 to lift the weights or rods 68 within said coils and cause the doors 38 and 40 to be rapidly rotated inwardly on the edges supported on the pins 42 and 44 so that the rodent or other animal on the trap-doors will plunge into the container 10. As soon as the light beam is restored, the solenoid coil 70 will be deenergized so that the weight 68 will return to the position shown in Figure 4 and again restore the trap-doors to their normal floor defining position.

It will thus be seen that the present invention provides an electrically operated trap of advantageous construction so that the rats or other rodents may be readily precipitated into the container without any danger of escaping by means of overstepping a treadle or delicately removing a bait. However it will be apparent to those skilled in the art that many changes and modifications may be made in the construction and arrangement of the parts thereof without departing from the true spirit or scope of the invention.

What is claimed as new is:

1. An electrically operated animal trap comprising a trap chamber, a demountable trap unit forming a closure for the top of said chamber, depending flanges on said unit for locating said unit with respect to said chamber, said trap unit including a cover portion extending over said chamber and defining a covered passage, a trap door in the bottom of said passage, said trap-door providing communication between said passage and said chamber, said trap-door being hingedly mounted adjacent one edge thereof, an operating pin fixed on said door in spaced relation from said edge, a first sheave mounted in said unit above said pin, a second sheave mounted on one of said depending flanges below said pin, a flexible element secured to said pin and entrained over said sheaves, a resilient section in said flexible element, a weight attached to said flexible element for biasing said door to closed position, an electromagnetic device operable when energized to lift said weight to open said door, a light beam projector arranged to project a light beam across said passage, a reflector receiving said light beam, a light-sensitive control device, said reflector directing said light beam to said control device, and means actuated by said control device for energizing said electromagnetic device when said beam is interrupted by an animal in said passage.

2. In an animal trap including a container, a trap-door hinged thereto, a door-actuating device comprising an operating pin fixed on said door in spaced relation from said edge, a first sheave mounted above said pin, a second sheave mounted below said pin, a flexible element secured to said pin and entrained over said sheaves, a resilient section in said flexible element, a weight attached to said flexible element for biasing said door to closed position, an electromagnetic device operable when energized to lift said weight to open said door, a light beam projector arranged to project a light beam across said passage, a reflector receiving said light beam, a light-sensitive control device, said reflector directing said light beam to said control device, and means actuated by said control device for energizing said electromagnetic device upon interruption of said beam.

References Cited in the file of this patent

UNITED STATES PATENTS

| 1,192,098 | Nelson | July 25, 1916 |
| 1,597,551 | Stewart | Aug. 24, 1926 |
| 2,042,349 | McGhee | May 26, 1936 |
| 2,107,080 | Mitchell | Feb. 1, 1938 |
| 2,515,947 | Crumrine | July 18, 1950 |

FOREIGN PATENTS

| 638,233 | Great Britain | July 7, 1950 |